US012475333B2

(12) United States Patent
Chekuri et al.

(10) Patent No.: US 12,475,333 B2
(45) Date of Patent: Nov. 18, 2025

(54) AUTOMATED TRANSLATIONS FOR AUTONOMOUS CHAT AGENTS

(71) Applicant: ADP, Inc., Roseland, NJ (US)

(72) Inventors: Sathya Vikram Chekuri, Alpharetta, GA (US); Henry Charles Will, IV, Roseland, NJ (US)

(73) Assignee: ADP, Inc., Roseland, NJ (US)

( * ) Notice: Subject to any disclaimer, the term of this patent is extended or adjusted under 35 U.S.C. 154(b) by 401 days.

(21) Appl. No.: 18/081,811

(22) Filed: Dec. 15, 2022

(65) Prior Publication Data

US 2024/0202468 A1 Jun. 20, 2024

(51) Int. Cl.
*G06F 40/58* (2020.01)
*G06F 40/35* (2020.01)
*G06N 20/00* (2019.01)

(52) U.S. Cl.
CPC .............. *G06F 40/58* (2020.01); *G06F 40/35* (2020.01); *G06N 20/00* (2019.01)

(58) Field of Classification Search
CPC .......... G06F 40/58; G06F 40/35; G06N 20/00
See application file for complete search history.

(56) References Cited

U.S. PATENT DOCUMENTS 10,891,435 B1 * 1/2021 Ruiz ................. G06F 40/30
11,354,521 B2 * 6/2022 Kuczmarski ............ G06F 40/35
2017/0371870 A1 * 12/2017 Eck .................. G06F 40/47
2020/0184158 A1   6/2020 Kuczmarski et al.
2021/0390268 A1 * 12/2021 Pandey ............... G06N 5/025

FOREIGN PATENT DOCUMENTS

EP        3 736 726 A1     11/2020

OTHER PUBLICATIONS

Indrek Vainu, Ultimate Guide for Creating Multilingual Chatbots, Sep. 3, 2021, 14 pages, retrieved from the Internet: URL:https://web.archive.org/web/20220706104711/https://www.alphachat.ai/blog/multilingual-chatbot.
International Search Report and Written Opinion issued in corresponding International Application No. PCT/US2023/08433112, dated Apr. 15, 2024 (13 pages).

* cited by examiner

*Primary Examiner* — Bhavesh M Mehta
*Assistant Examiner* — Eunice Lee
(74) *Attorney, Agent, or Firm* — Foley & Lardner LLP (57) ABSTRACT

Disclosed are various embodiments for automated translations for autonomous chat agents. A build service can send a translation request to a machine translation service, the translation request comprising training data in a first language and the translation request specifying a second language. The build service can then receive translated training data from the machine translation service, the translated training data having been translated from the training data into the second language. Next, the build service can create a translated workflow that comprises a translated machine learning model and a translated intent. Subsequently, the build service can add the translated training data to the translated workflow and train the translated machine learning model using the translated training data.

17 Claims, 4 Drawing Sheets

AUTOMATED TRANSLATIONS FOR AUTONOMOUS CHAT AGENTS

BACKGROUND

Autonomous chat agents are used to provide automated responses to user queries or commands while providing an experience similar to interacting with another individual. Users can provide natural language requests or commands to the autonomous chat agent, and the autonomous chat agent can use natural language processing to determine the intent of the user and attempt to obtain the requested information or perform the requested operation. Autonomous chat agents can be used for a wide variety of purposes, such as providing automated customer support or customer service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for automating the deployment of autonomous chat agents in multiple languages. An autonomous agent can be deployed in a first language or a primary language, such as English. The corpus of training data used to identify user intents using natural language processing can then be translated into a second language. The responses that might be used by the autonomous agent in response to an identified user intent can also be translated in the second language. A natural language processing machine-learning model can then be trained on the translated training data to identify user intents expressed in the second language, allowing the autonomous chat agent to identify user intents in the second language and provide appropriate responses to the user in the second language. These approaches have a number of technical and practical benefits compared to other approaches for creating and deploying autonomous chat agents to support multiple languages.

For example, one alternative approach would be to translate all user inputs from the second language into the first language, and then provide the translated user input to the autonomous chat agent. Any responses from the autonomous chat agent in the first language could then be translated back into the second language prior to returning the response to the user. However, there are several technical and practical disadvantages with this approach. First, the real-time translation consumes significant, additional computing resources, which may have additional cost. Second, the real-time translation also introduces additional latency into communications between the user and the autonomous chat agent. Third, mistranslations by the translation service could result in misidentification of the user intent and/or an inappropriate response being provided to the user by autonomous chat agent. In contrast, various approaches of the present disclosure do not consume these additional resources, add additional latency to the user experience, or suffer from translation errors because the various embodiments of the present disclosure build a translated set of training data and responses from the primary set of training data and responses.

Another potential alternative approach would be to build a corpus of text, including both training data for identifying user inputs and for responses by the autonomous chat agent, for language to be supported an autonomous chat agent. However, this approach has the practical disadvantage that multiple separate, independent corpuses of text would need to be maintained. Changes to one corpus of text for a first language would not automatically be propagated to a separate corpus of text for another language.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
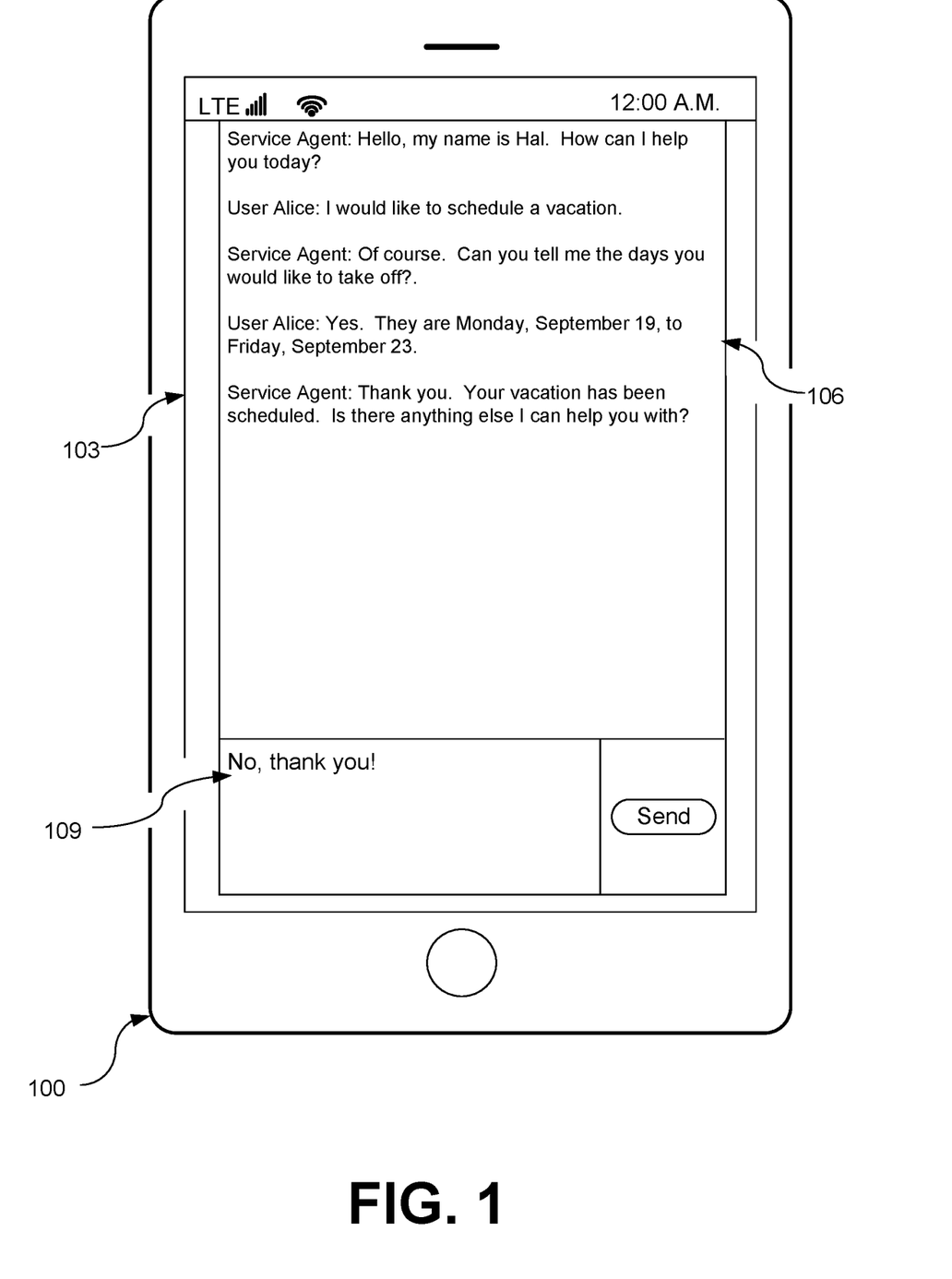
FIG. 1 is a drawing depicting one of several embodiments of the present disclosure.

As illustrated in FIG. 1, a client device 100 can be used to interact with a chat agent. The client device 100 can cause various user interface elements to be presented on a display 103 of the client device 100. For example, an interaction history 106 could be presented that shows the previous dialog or interactions between the user of the client device 100 and the chat agent. A submission box 109 could also be presented on the display 103, where a user can enter queries, requests, or responses for the chat agent. Although interaction history 106 shows a dialog that occurs in English, various embodiments of the present disclosure provide for approaches to quickly deploy chat agents that can interact with the user in other languages.

Figure 2:
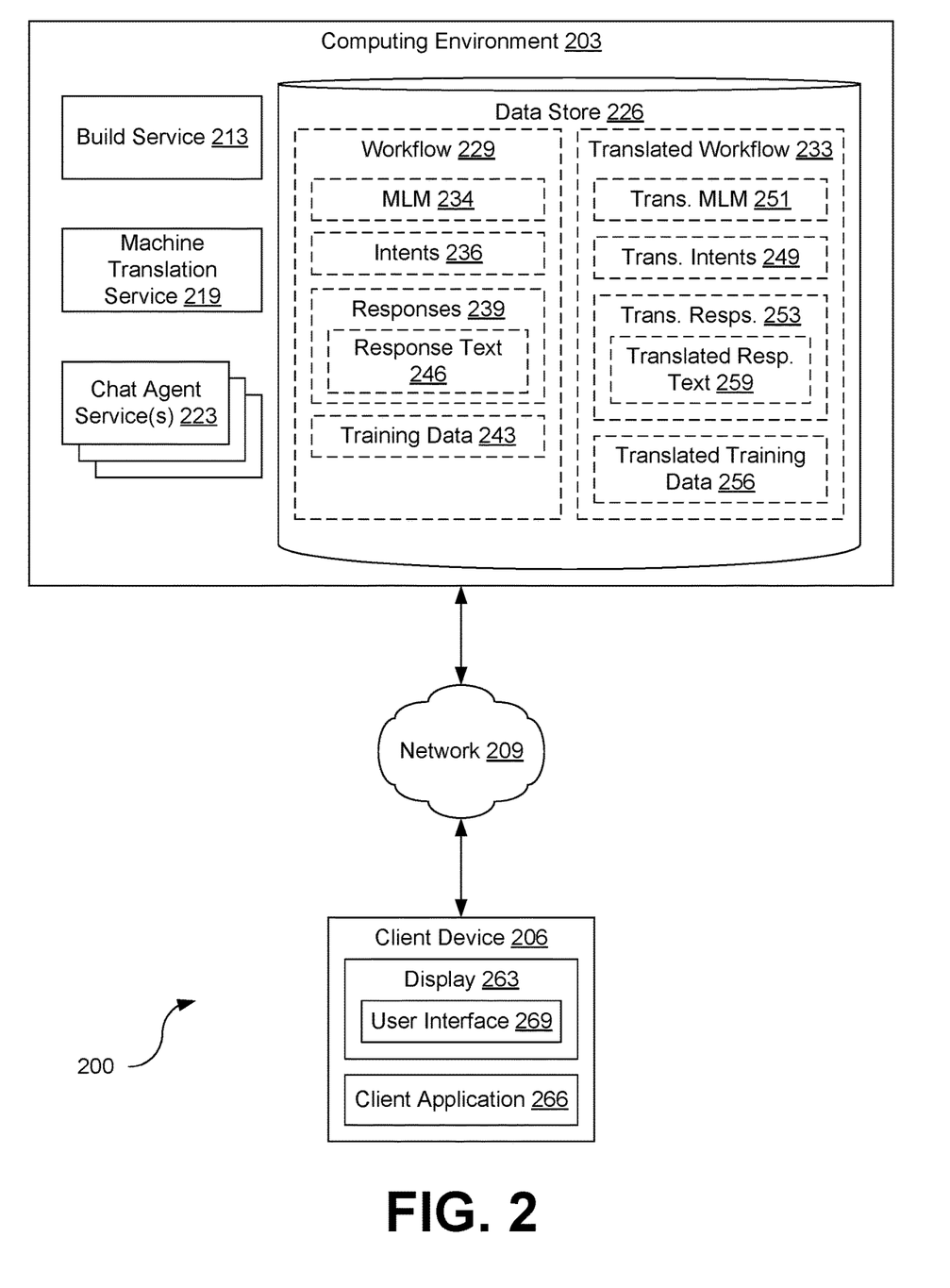
FIG. 2 is a drawing of a network environment according to various embodiments of the present disclosure.

With reference to FIG. 2, shown is a network environment 200 according to various embodiments. The network environment 200 can include a computing environment 203 and a client device 206 (which could include the client device 100 depicted in FIG. 1). The computing environment 203, client device 206, and other devices can be in data communication with each other via a network 209.

The network 209 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 include a build service 213, a machine translation service 219, and a chat agent service 223, and other applications, services, processes, systems, engines, or functionality not discussed in detail herein.

Also, various data is stored in a data store 226 that is accessible to the computing environment 203. The data store 226 can be representative of a plurality of data stores 226, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 226 is associated with the operation of the various applications or functional entities described below. This data can include one or more workflows 229, one or more translated workflows 233, and potentially other data.

A workflow 229 can represent the data used to evaluate user requests or queries, sometimes referred to as utterances, and respond appropriately. Accordingly, a workflow 229 can include a machine learning model 234 that recognizes one or more intents 236 that are trained from training data 243, and one or more responses 239. Other data can also be included in a workflow 229 as needed for specific implementations.

The machine learning model 234 can represent a model for identifying an intent 236 of a user based on natural language processing of text submitted to the machine learning model 234. The intent 236 identified by the machine learning model 234 may indicate to the workflow 229 an appropriate response 239 to provide to the user and/or an appropriate action to perform. Examples of machine learning models 234 include neural network machine learning models (e.g., recurrent neural networks, convolutional neural networks, etc.), decision tree learning models, etc. Accordingly, the machine learning model 234 can be trained to identify one or more intents 236 using training data 243.

An intent 236 can represent an intended command or query made by a user, as identified by the chat agent service 223 using a machine learning model, such as the machine learning model 234 or a translated machine learning model 251. For example, an intent 236 could represent a request for information (e.g., a request for a status of an order from an electronic commerce storefront, a request for a paystub from a payroll application, a request for a current amount of accrued paid time off (PTO), etc.). As another example, an intent 236 could represent a request to perform some sort of action or workflow (e.g., change or cancel an order, schedule (PTO), adjust payroll withholding, change direct deposit settings, etc.).

Accordingly, each intent 236 within a workflow 229 could be associated with training data 243. The training data 243 can represent words or phrases that have been specified as being associated with the intent 236. The training data 243 could be predefined or previously specified by the developer, programmer, data scientist, or other individual who created the machine learning model 229 or intent 236. The training data 243 could also be stored using key-value pairs, where each word or phrase listed in the training data 243 is identified by a respective key. This data structure could be used to allow for individual words or phrases that are translated by the machine translation service 219 to be replaced or overridden by more accurate translations provided from another source (e.g., by a professional translator).

Meanwhile, a response 239 can represent a response to an intent 236. Each response 239 can be mapped to an intent 236 (e.g., by storing an intent identifier for an intent 236 in association with the response 239 to the intent 236). The response can also store information specifying the actions that need to be performed by a chat service agent 223 to service the respective intent 236, including specifying how the chat service agent 223 should respond to a user. Accordingly, each response 239 could include response text 246. The response text 246 can represent the words or phrases to be used by the chat agent service 223 when it responds to the request or command of the user corresponding to the intent 236 identified for the user by the machine learning model 234. The response text 246 could be predefined or previously specified by the developer or programmer who created the machine learning model 234 or response 239. The response text 246 could also be stored using key-value pairs, where each word or phrase listed in the response text 246 is identified by a respective key. This data structure could be used to allow for individual words or phrases that are translated by the machine translation service 219 to be replaced or overridden by more accurate translations provided from another source (e.g., by a professional translator).

Each workflow 229 can also have configuration data to determine for individual workflows whether individual intents 236 or responses 239 should be translated and/or included in a translated workflow 233 as translated intents 249 or translated responses 253. For example, certain intents 236 may or not be culturally or geographically relevant, and therefore should not be translated into respective translated intents 249. Likewise, additional translated intents 249 and translated training data 256 may need to be added to the translated workflow 233 for which there are no corresponding intents 236 or training data 243 present in the workflow 229.

The translated workflow 233 can represent a workflow 229 that has been translated into another language by the build service 213. Similar to a workflow 229, the translated workflow 233 can include one or more translated intents 249, a translated machine learning model 251, one or more translated responses 253, and translated training data 256. A translated intent 249 can represent an intent identified by the translated workflow 233 using natural language processing. To identify translated intents 249, the translated machine learning model 251 could be trained using translated training data 256, which can represent words or phrases of the training data 243 that have been translated into the language of the translated workflow 233. An appropriate translated response 253 can then be selected for responding to a translated intent 249 identified by the translated machine learning model 251, and translated response text 259 can be used by the chat service agent 223 to provide a response to the user in the second language.

The build service 213 can be executed to setup and deploy language specific chat agent services 223, or to update existing chat agent services 223. Accordingly, the build service 213 can be executed to generate translated workflows 233 in a specified or desired language from an existing workflow 229. Once a translated workflow 233 is generated, the build service 213 can cause the translated machine learning model 251 of the translated workflow 233 to evaluate the translated training data 256 in order to train itself to detect translated intents 249. The build service 213 could also instantiate or otherwise create or deploy a new or updated instance of a chat agent service 223 in a specific language by directing the chat agent service 223 to use a specified translated workflow 233 in the desired language.

The machine translation service 219 can be executed to provide automated or machine translations of text from one language into another language. For example, the machine translation service 219 could be executed to translate training data 243 into translated training data 256 or response text 246 into translated response text 259. In some instances, the automated or machine translations may be overridden by human created translations which are also kept in the data store 226 and as an override for the automated or machine translation.

Individual chat agent services 223 can be used to provide an artificially intelligent chat agent to interact with users of client devices 206 using natural language in order to provide answers to user utterances, such as user queries or requests or to perform user commands. Because different users may prefer to communicate in different languages, individual chat agent services 223 can be provided or provisioned to provide user support in their preferred language, if supported. In order to support individual users, chat agent services 223 could be assigned one or more workflows 229 or translated workflows 233 based on the language the chat agent service 223 is intended to provide support in.

In some instances, a chat agent service 223 could provide multilingual support. In these instances, the chat agent service 223 would first determine the language of a user input or the current language setting for the client device 206 or client application 266, and then would select the appropriate workflow 229 or translated workflow 233 based at least in part on the identified language. However, as previously discussed, single language chat agent services 223 could also be deployed. In these instances, multiple languages would be supported through the deployment of multiple, language specific chat agent services 223.

The client device 206 is representative of a plurality of client devices that can be coupled to the network 209. The client device 206 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 206 can include one or more displays 263, such as liquid crystal displays (LCDs), gas plasma-based flat panel displays, organic light emitting diode (OLED) displays, electrophoretic ink ("E-ink") displays, projectors, or other types of display devices. In some instances, the display 263 can be a component of the client device 206 or can be connected to the client device 206 through a wired or wireless connection.

The client device 206 can be configured to execute various applications such as a client application 266 or other applications. The client application 266 can be executed by a client device 206 to interact with a chat agent service 223 within a user interface 269 on the display 263. To this end, the client application 266 can include a browser, a dedicated application, or other executable, and the user interface 269 can include a web page, an application screen, or other user mechanism for obtaining user input. The client device 206 can be configured to execute applications beyond the client application 263 such as email applications, social networking applications, word processors, spreadsheets, or other applications.

In some instances, however, the client application 266 could interact with the user without the use of a display 263. For example, client devices 206 that lack a display (e.g., smart speakers) or otherwise include a microphone and speaker (e.g., smartphones, tablets, smartwatches, and personal computers), could allow a user to speak to the client application 266, such as a virtual voice assistant (e.g., ALEXA, SIRI, CORTANA, etc.) using a microphone. The client application 266 could then use speech-to-text conversion to convert the recorded audio to text that is submitted to a chat agent service 223 and convert any text received from the chat agent service 223 back to audio using a text-to-speech conversion.

Next, a general description of the operation of the various components of the network environment 200 is provided. However, the following general description is merely intended as an illustrative example of the various interactions between the components of the network environment 200. More detailed descriptions of the operations of specific components of the network environment 200 are provided in the description accompanying FIGS. 3 and 4.

To begin, a workflow 229 can be created in a first language. The workflow 229 can include a machine learning model 234, one or more intents 236 that contain relevant information to allow a chat agent service 223 to determine the intent of the user based at least in part on interactions with the chat agent service 223, and one or more responses 239 that would be appropriate for the chat agent service 223 to provide to a user based at least in part on an identified intent 236. The first language can be selected based on any number of factors. For example, the first language could be selected because it is the native language of the individuals developing and training the machine learning model 234 or because it is the native language of the largest number of users.

However, not all users may speak or understand the first language well, if at all. In order to provide appropriate support to more users, a chat agent service 223 may need to be deployed to support users in a second language. Moreover, the user experience will need to be similar to the experience that users would have when interacting with a first instance of the chat agent service 223 that supports the first language. Accordingly, the build service 213 can be executed to deploy one or more chat agent services 223 to support users in multiple languages.

First, the build service 213 can create a translated workflow 233 in a second language, the translated workflow 233 corresponding to a respective workflow 229 developed in the first language. Corresponding translated intents 249 (trained from the translated intents 249) and translated responses 253 can be created for the respective intents 236 and responses 239 of the machine learning model 234.

The build service 213 can submit the training data 243 to the machine translation service 219 and receive translated training data 256 in response. Also, if desired, some training data 243 could be translated manually and stored as translated data 256. The translated training data 256 can then be saved as part of the translated workflow 233. If manually translated training data 256 exists for any intent 236, then the build service 213 can elect not to use the machine translation service 219 for that intent 236 and will not build or replace the manually created translated data 256 for the respective intent 236. Similarly, the build service 213 can submit the response text 246 for each response 239 in the workflow 229 and receive translated response text 259 from the machine translation service 219. However, in instances where translated responses 259 may be manually translated, the build service 213 will not override or replace these manually translated response texts 259. The translated response text 259 can then be saved in the respective translated responses 253.

Moreover, the build service 213 can elect not to generate certain translated intents 249, translated responses 253, translated training data 256, or translated training data 156 in certain situations. For example if an intent 236, response 239, training data 243, or response text 246 were flagged as specific to a particular jurisdiction or geography, then the build service 213 could skip translation for a language that is not associated with the jurisdiction or geography.

Subsequently, the build service 213 can then train or cause the translated machine learning model 251 of the translated workflow 233 to be trained using the translated training data 256 to determine which words or phrases in the second language are likely to indicate a user's expressed desire for the translated intent 249.

Once the translated machine learning workflows 233 have been created, including the translated intents 249, translated machine learning model 251, and translated responses 253 with translated response text 259, the build service 213 can create and/or deploy a chat agent service 223 that uses one or more of the translated workflows 233 to process user utterances (user requests, queries, or commands) in a second language. For example, the build service 213 could use a template or model chat agent service 223, and specify in its configuration to use the translated workflow 233 in the second language.

The chat agent service 223 could then receive, from a client application 266, user utterances in the second language. When a user utterance is received, it could provide the utterance as an input or argument to the machine learning model 234 or translated machine learning model 251, depending on the language of the chat agent service 233. The machine learning model 234 or the translated machine learning model 251 could then predict or identify an intent 236 or a translated intent 249 that is most likely to represent the query, request, or command of the user utterance. The chat agent service 223 could then execute the step or steps specified in the response 239 or translated response 253 associated with the intent 236 or the translated intent 249 and perform any action specified by the response 239 or translated response 253, which could include providing response text 246 or translated response text 259 to the client application 266. As a result, chat agent services 223 can be deployed to support multiple languages.

Figure 3:
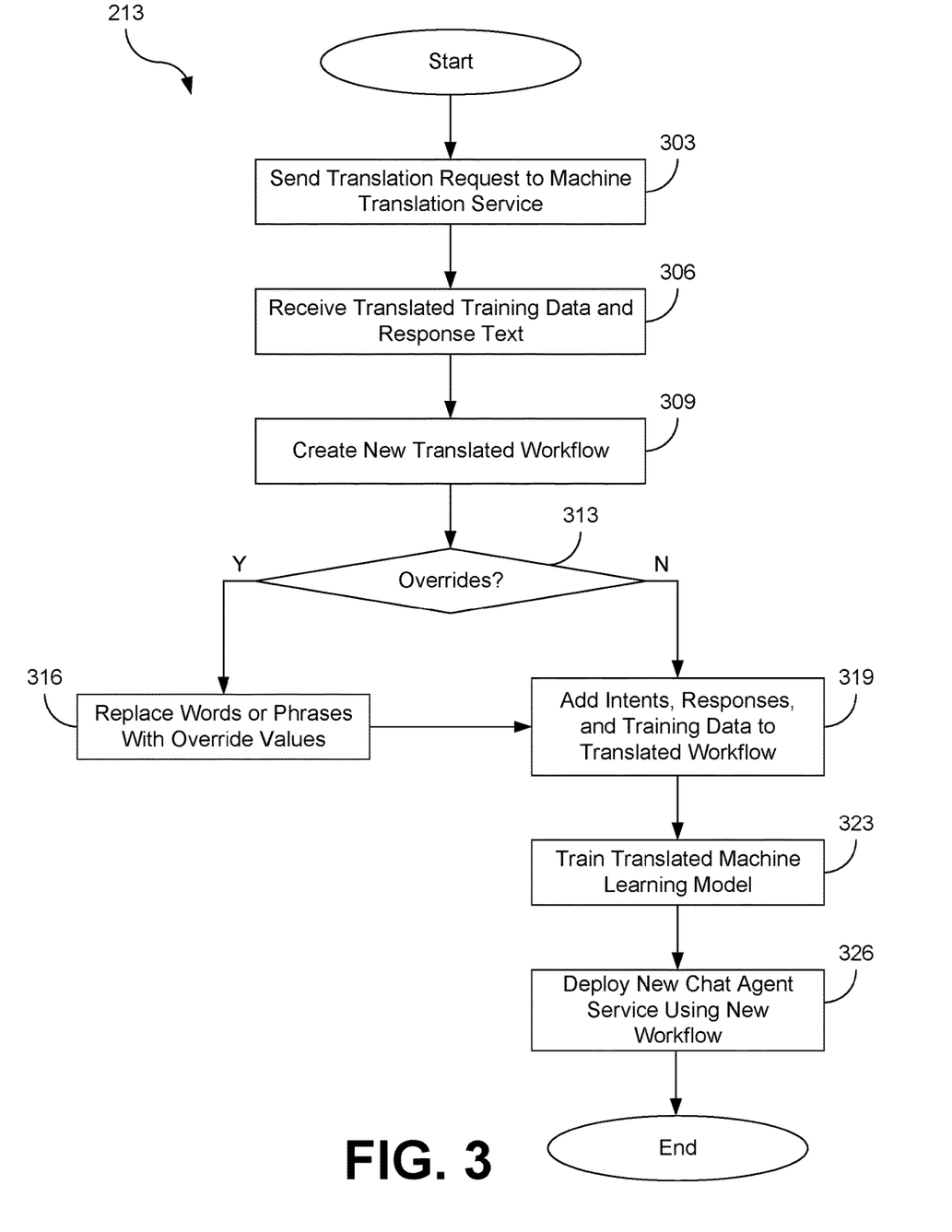
FIG. 3 is a flowchart illustrating one example of functionality implemented as portions of an application executed in a computing environment in the network environment of FIG. 2 according to various embodiments of the present disclosure.

Referring next to FIG. 3, shown is a flowchart that provides one example of the operation of a portion of the build service 213. The flowchart of FIG. 3 provides merely an example of the many different types of functional arrangements that can be employed to implement the operation of the depicted portion of the build service 213. As an alternative, the flowchart of FIG. 3 can be viewed as depicting an example of elements of a method implemented within the network environment 200.

Beginning at block 303 the build service 213 can send a translation request to the machine translation service 219. The translation request can include training data 243 and response text 246 for each workflow 229 to be translated from a first language into a second language. The translation request can also specify the first language and the second language. However, the first language may be omitted from the translation request in some implementations because either the machine translation service 219 will be configured to automatically identify the first language or the machine translation service 219 will be configured to assume the first language is always the same language. As previously discussed, this could occur when a workflow 229 is maintained in one language and regularly translated into another language when a decision is made to have a chat agent service 223 support another language.

The translation request can be sent to the machine translation service 219, for example, in response to the build service 213 receiving a command or instruction to create, update, or otherwise deploy a new version of a chat agent service 223. This could occur, for example, when a new language is to be supported for the chat agent service 223 or to update support for an existing language by the chat agent service 223 (e.g., by supporting new intents 236 for a workflow 229 or new translated intents 249 for a translated workflow 233). A new translation request could also be sent for new responses 239 to be translated into translated responses 253.

Next, at block 306, the build service 213 can receive translated training data 256 and translated response text 259 from the machine translation service 219. The translated training data 256 and translated response text 259 can represent translated versions of the training data 243 and response text 246 provided to the machine translation service 219 at block 303.

Moving on to block 309, the build service 213 can create a new, translated workflow 233. The new, translated workflow 233 can later be used by a chat agent service 223 to provide support in another language by using the translated workflow 233 to interact with users in the other language.

Subsequently, at block 313, the build service 213 can determine whether any overrides for values in the translated training data 256 or the translated response text 259 have been specified. For example, the build service 213 could check a language specific configuration or manifest file which could specify preferred translation values for individual words or phrases in the training data 243 or response text 246. For instance, the configuration or manifest file could specify a key and a respective word or phrase to be used as a value for the key instead of the word or phrase produced by the machine translation service 219. If one or more overrides have been detected or identified, then the process can proceed to block 316. If no overrides have been detected or identified, then the process can instead skip to block 319.

If the process proceeds to block 316, the build service 213 can update the translated training data 256 and/or translated response text 259 to include the words or phrases specified as overrides. For example, for each key value listed in the translated training data 256 or the translated response text 259, the build service 213 could replace the text from the machine translation service 219 with the text specified as an override in the manifest or configuration file.

Then, at block 313, the build service 213 can add data to the translated workflow 233. This can include adding translated intents 249, translated responses 253 with translated response text 259, and translated training data 256.

Next, at block 323, the build service 213 can train the translated machine learning model 251 of the translated workflow 233 to identify translated intents 249 using the translated training data 256. This can be done so that the translated workflow 233 can use the translated machine learning model 251 to determine or predict which words or phrase in the second language most closely or most likely indicate a translated intent 249.

Moving on to block 326, the build service 213 can then deploy a new chat agent service 223 to support the second language. As part of the deployment process, the build service 213 can incorporate or link the new, translated workflow 233 with the new chat agent service 223. This allows the chat agent service 223 to receive and service requests in the second language.

Figure 4:
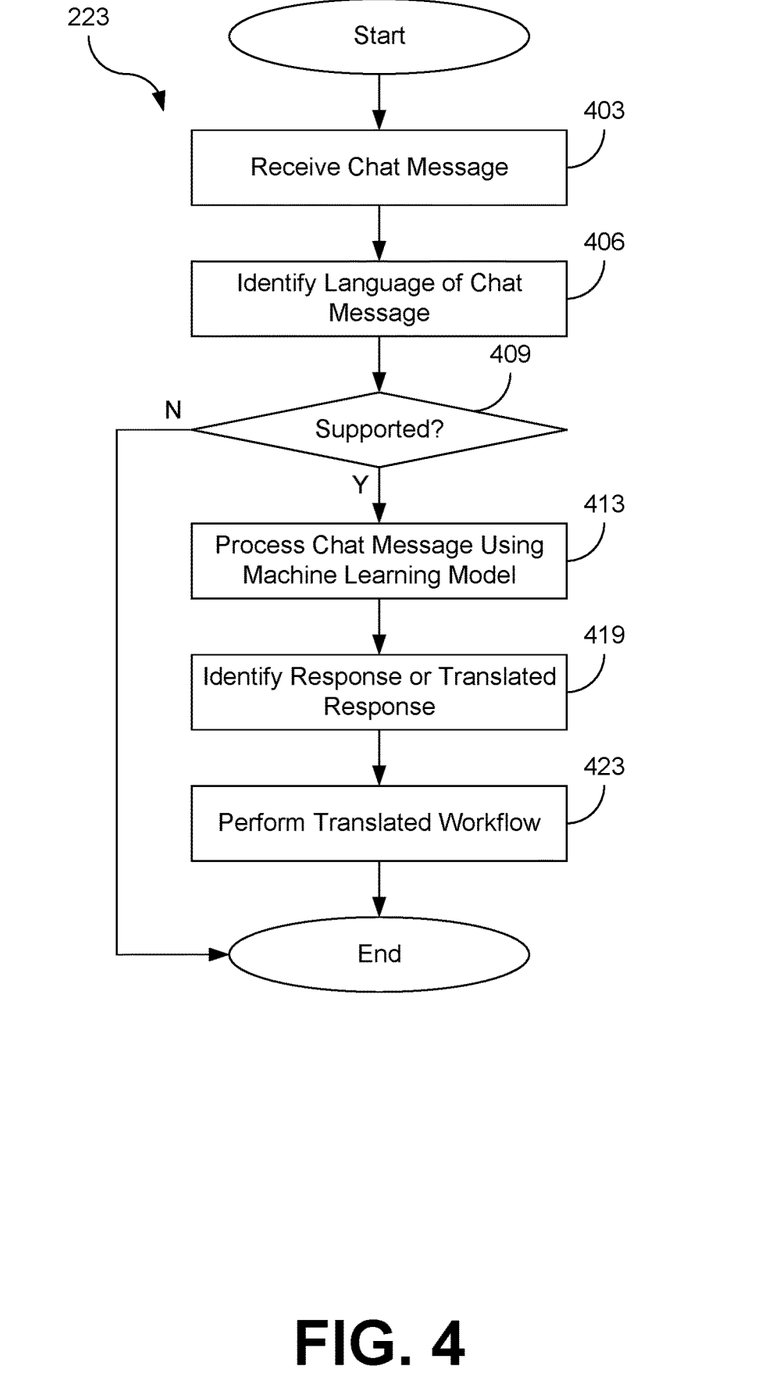
FIG. 4 is a flowchart illustrating one example of functionality implemented as portions of an application executed in a computing environment in the network environment of FIG. 2 according to various embodiments of the present disclosure.

Referring next to FIG. 4, shown is a flowchart that provides one example of the operation of a portion of the chat agent service 223. The flowchart of FIG. 4 provides merely an example of the many different types of functional arrangements that can be employed to implement the operation of the depicted portion of the chat agent service 223. As an alternative, the flowchart of FIG. 4 can be viewed as depicting an example of elements of a method implemented within the network environment 200.

Beginning with block 403, the chat agent service 223 can receive a chat message from a client application 266. The chat message can be received in various forms. For example, the chat message could be text received from the client application 266 that was entered by a user (e.g., a chat window). As another example, the chat message could be text that was converted from audio using a speech-to-text converter (e.g., as a result of a user speaking to his or her client device 206 and the audio being captured by the client application 266).

Then, at block 406, the chat agent service 223 can identify the language of the chat message. This could be done using various natural language processing techniques or the language could be deduced based at least in part on a current or default language setting of the client device 206 or client application 266. Once the language is identified, then the chat agent service 223 can determine if the language is supported. If the language is supported, then processing of the chat message continues at block 413. However, if the language is unsupported, then the process can end, although the chat agent service 223 could return an error message to the client application 266 indicating that the language is unsupported.

At block 413, the chat agent service 223 can process the chat message using a respective machine learning model, such as the machine learning model 234 or the translated machine learning model 251. The machine learning model can be used evaluate which intent 236 or translated intent 249 the chat message most likely expresses based at least in part on an earlier training of the machine learning model.

Subsequently, at block 419, the chat agent service 223 can identify an appropriate response 239 or translated response 253 to perform based at least in part on the intent 236 or translated intent 249 identified by the machine learning model at block 413.

Then, at block 423, the chat agent service 223 can perform the steps specified by the response 239 or translated response 253. For example, if the intent 236 or translated intent 249 indicates that a user wishes to schedule a vacation, the chat agent service 223 could perform one or more responses 239 or translated responses 253, including returning response text 246 or translated response text 259 to the user in order to solicit additional information from the user. As another example, if the intent 236 or translated intent 249 indicates that a user is requesting specific information, the chat agent service 223 could perform the steps specified in a respective response 239 or translated response 253 to obtain the requested user information and provide it to the user formatted using the response text 246 or translated response text 259.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system to reduce processing cycles associated with execution of models used by autonomous chat agents, comprising:
   one or more processors and a memory; and
   machine-readable instructions stored in the memory that, when executed by the one or more processors, cause the one or more processors to at least:
   receive, from a service executed by the one or more processors, a request to update an autonomous chat agent, wherein the autonomous chat agent uses a workflow to process queries in a first language, wherein the workflow includes: (i) at least one intent, (ii) one or more responses, (iii) training data, and (iv) a machine learning model configured to recognize the at least one intent in the first language and provide one or more responses based on the at least one intent;
   generate, responsive to receipt of the request, a translated workflow from the workflow, wherein the translated workflow corresponds to a second language and to generate the translated workflow, the one or more processors:
      send, to a machine translation service, a translation request that specifies the second language, the translation request comprising the training data having words or phrases of the workflow in the first language, wherein the words or phrases correspond to the at least one intent of the workflow;

receive, from the machine translation service responsive to the translation request, translated training data in the second language that is generated, by the machine translation service, from a translation of the training data in the first language, wherein the translated training data indicates words or phrases in the second language that relate to the at least one intent of the workflow; and train a translated machine learning model using the translated training data to predict words or phrases in the second language corresponding to the at least one intent;

link, responsive to generation of the translated workflow, the translated workflow to the autonomous chat agent, wherein the translated workflow configures the autonomous chat agent to receive messages in the second language and provide responses to the messages based on one or more intents of the messages identified via the translated machine learning model; and update, responsive to receipt of the responses, the translated machine learning model based on feedback received from a user interface of the autonomous chat agent, the feedback indicative of an accuracy of the one or more intents reflected in the responses.

2. The system of claim 1, wherein the machine-readable instructions further cause the one or more processors to at least:

receive an override instruction for the at least one intent, the override instruction specifying a replacement value for at least one word or phrase in the translated training data; and include the replacement value in the translated training data.

3. The system of claim 1, wherein the translation request further comprises one or more responses in the first language and the machine-readable instructions further cause the one or more processors to at least receive one or more translated responses from the machine translation service, the one or more translated responses having been translated from the one or more responses into the second language.

4. The system of claim 1, wherein the translation request is a first translation, the workflow is a first translated workflow, and the machine-readable instructions further cause the one or more processors to at least:

send a second translation request to the machine translation service, the second translation request comprising updated training data in the first language and the second translation request specifying the second language;

receive updated translated training data from the machine translation service, the updated translated training data having been translated from the updated training data into the second language;

create a second translated workflow to replace the first translated workflow, the second translated workflow comprising a second translated machine learning model and at least one translated intent;

add the updated translated training data to the second translated workflow; and train the second translated machine learning model using the updated translated training data.

5. The system of claim 4, wherein the autonomous chat agent is a first autonomous chat agent and the machine-readable instructions further cause the one or more processors to at least replace the first autonomous chat agent with a second autonomous chat agent in the second language, the second autonomous chat agent being configured to use the second translated machine learning model to process user requests in the second language.

6. The system of claim 1, wherein the machine-readable instructions further cause the one or more processors to at least add a second translated intent to the translated machine learning model, the second translated intent being based at least in part on the second language or a geographic area associated with the translated machine learning model.

7. A method to reduce processing cycles associated with execution of models used by autonomous chat agents, comprising:

receive, by one or more processors, from a service executed by the one or more processors, a request to update an autonomous chat agent, wherein the autonomous chat agent uses a workflow to process queries in a first language, wherein the workflow includes: (i) at least one intent, (ii), one or more responses, and (iii) training data, and (iv) a machine learning model configured to recognize the at least one intent in the first language and provide one or more responses based on the at least one intent generating, by the one or more processors, responsive to receipt of the request, a translated workflow from the workflow, wherein the translated workflow corresponds to a second language and to generate the translated workflow, wherein generating the translated workflow from the workflow comprises:

sending, by the one or more processors, to a machine translation service, a translation request that specifies the second language, the translation request comprising the training data having words or phrases of the workflow in the first language, wherein the words or phrases correspond to the at least one intent of the workflow;

receiving, by the one or more processors, from the machine translation service responsive to the translation request, translated training data in the second language that is generated, by the machine translation service, from a translation of the training data in the first language, wherein the translated training data indicates words or phrases in the second language that relate to the at least one intent of the workflow; and training, by the one or more processors, a translated machine learning model using the translated training data to predict words or phrases in the second language corresponding to the at least one intent;

linking, by the one or more processors, responsive to generation of the translated workflow, the translated workflow to the autonomous chat agent, wherein the translated workflow configures the autonomous chat agent to receive messages in the second language and provide responses to the messages based on one or more intents of the messages identified via the translated machine learning model; and update, by the one or more processors, responsive to receipt of the responses, the translated machine learning model based on feedback received from a user interface of the autonomous chat agent, the feedback indicative of an accuracy of the one or more intents reflected in the responses.

8. The method of claim 7, further comprising
receiving, by the one or more processors, an override instruction for the at least one intent, the override instruction specifying a replacement value for at least one word or phrase in the translated training data; and
including, by the one or more processors, the replacement value in the translated training data.

9. The method of claim 7, wherein the translation request further comprises one or more responses in the first language and the method further comprises receiving, by the one or more processors, one or more translated responses from the machine translation service, the one or more translated responses having been translated from the one or more responses into the second language.

10. The method of claim 7, wherein the translation request is a first translation, the workflow is a first translated workflow, and the method further comprises:
sending, by the one or more processors, a second translation request to the machine translation service, the second translation request comprising updated training data in the first language and the second translation request specifying the second language;
receiving, by the one or more processors, updated translated training data from the machine translation service, the updated translated training data having been translated from the updated training data into the second language;
creating, by the one or more processors, a second translated workflow to replace the first translated workflow, the second translated workflow comprising a second translated machine learning model and at least one translated intent;
adding, by the one or more processors, the updated translated training data to the second translated workflow; and
training, by the one or more processors, the second translated machine learning model using the updated translated training data.

11. The method of claim 10, wherein the autonomous chat agent is a first autonomous chat agent and the method further comprises replacing, by the one or more processors, the first autonomous chat agent with a second autonomous chat agent in the second language, the second autonomous chat agent being configured to use the second translated machine learning model to process user requests in the second language.

12. The method of claim 7, further comprising adding a second translated intent to the translated workflow, the second translated intent being based at least in part on the second language or a geographic area associated with the translated machine learning model.

13. A non-transitory, computer-readable medium, comprising machine-readable instructions that, when executed by one or more processors, cause the one or more processors to at least:
receive, from a service executed by the one or more processors, a request to update an autonomous chat agent, wherein the autonomous chat agent uses a workflow to process queries in a first language, wherein the workflow includes: (i) at least one intent, (ii), one or more responses, and (iii) training data, and (iv) a machine learning model configured to recognize the at least one intent in the first language and provide one or more responses based on the at least one intent;
generate, responsive to receipt of the request, a translated workflow from the workflow, wherein the translated workflow corresponds to a second language and to generate the translated workflow, the one or more processors:
send, to a machine translation service, a translation request that specifies the second language, the translation request comprising the training data having words or phrases of the workflow in the first language, wherein the words or phrases correspond to the at least one intent of the workflow;
receive, from the machine translation service responsive to the translation request, translated training data in the second language that is generated, by the machine translation service, from a translation of the training data in the first language, wherein the translated training data indicates words or phrases in the second language that relate to the at least one intent of the workflow;
and
train a translated machine learning model using the translated training data to predict words or phrases in the second language corresponding to the at least one intent;
link, responsive to generation of the translated workflow, the translated workflow to the autonomous chat agent, wherein the translated workflow configures the autonomous chat agent to receive messages in the second language and provide responses to the messages based on one or more intents of the messages identified via the translated machine learning model; and
update, responsive to receipt of the responses, the translated machine learning model based on feedback received from a user interface of the autonomous chat agent, the feedback indicative of an accuracy of the one or more intents reflected in the responses.

14. The non-transitory, computer-readable medium of claim 13, wherein the machine-readable instructions further cause the one or more processors to at least
receive an override instruction for the at least one intent, the override instruction specifying a replacement value for at least one word or phrase in the translated training data; and
include the replacement value in the translated training data.

15. The non-transitory, computer-readable medium of claim 13, wherein the translation request further comprises one or more responses in the first language and the machine-readable instructions further cause the one or more processors to at least receive one or more translated responses from the machine translation service, the one or more translated responses having been translated from the one or more responses into the second language.

16. The non-transitory, computer-readable medium of claim 13, wherein the translation request is a first translation, the workflow is a first translated workflow, and the machine-readable instructions further cause the one or more processors to at least:
send a second translation request to the machine translation service, the second translation request comprising updated training data in the first language and the second translation request specifying the second language;
receive updated translated training data from the machine translation service, the updated translated training data having been translated from the updated training data into the second language;

create a second translated workflow to replace the first translated workflow, the second translated workflow comprising a second translated machine learning model and at least one translated intent;

add the updated translated training data to the second translated workflow; and train the second translated machine learning model using the updated translated training data.

17. The non-transitory, computer-readable medium of claim 16, wherein the autonomous chat agent is a first autonomous chat agent and the machine-readable instructions further cause the one or more processors to at least replace the first autonomous chat agent with a second autonomous chat agent in the second language, the second autonomous chat agent being configured to use the second translated machine learning model to process user requests in the second language.

* * * * *